United States Patent
Park et al.

(10) Patent No.: US 11,525,310 B2
(45) Date of Patent: Dec. 13, 2022

(54) METHOD FOR INSTALLING FIBER ON PRODUCTION CASING

(71) Applicant: Halliburton Energy Services, Inc., Houston, TX (US)

(72) Inventors: Brian Vandellyn Park, Spring, TX (US); Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 57 days.

(21) Appl. No.: 16/978,239

(22) PCT Filed: Jun. 14, 2018

(86) PCT No.: PCT/US2018/037633
§ 371 (c)(1),
(2) Date: Sep. 4, 2020

(87) PCT Pub. No.: WO2019/240803
PCT Pub. Date: Dec. 19, 2019

(65) Prior Publication Data
US 2021/0003803 A1 Jan. 7, 2021

(51) Int. Cl.
*E21B 17/02* (2006.01)
*E21B 47/135* (2012.01)
(Continued)

(52) U.S. Cl.
CPC .......... *E21B 17/026* (2013.01); *E21B 47/135* (2020.05); *G02B 6/447* (2013.01);
(Continued)

(58) Field of Classification Search
CPC ..... E21B 17/026; E21B 47/135; G02B 6/447; G02B 6/504
See application file for complete search history.

(56) References Cited

U.S. PATENT DOCUMENTS 7,201,233 B2 * 4/2007 Penisson ................. E21B 17/10
166/85.5
7,337,853 B2 * 3/2008 Buytaert ................. E21B 19/22
166/381
(Continued)

FOREIGN PATENT DOCUMENTS

WO  2014178998 A1  11/2014
WO  2016141194 A1  9/2016
(Continued)

OTHER PUBLICATIONS

PCT Application Serial No. PCT/US2018/037633, International Search Report, dated Mar. 14, 2019, 3 pages.
(Continued)

*Primary Examiner* — Nicole Coy
(74) *Attorney, Agent, or Firm* — Delizio, Peacock, Lewin & Guerra

(57) ABSTRACT

A method of assembling an optical fiber cable on production casing includes positioning the optical fiber cable against a production casing at a hole of a well site, and affixing the optical fiber cable against the production casing by applying an adhesive to the production casing to secure the optical fiber cable against the production casing. The method further includes applying pressure to the adhesive to adhesively bond the optical fiber cable to the production casing along a length of the production casing while the production casing is being run-in-hole.

20 Claims, 7 Drawing Sheets

(51) Int. Cl.
  *G02B 6/44* (2006.01)
  *G02B 6/50* (2006.01)
(52) U.S. Cl.
  CPC ............ *G02B 6/504* (2013.01); *G02B 6/4459* (2013.01); *G02B 6/502* (2013.01)

(56) References Cited

U.S. PATENT DOCUMENTS

| | | | | |
|---|---|---|---|---|
| 7,532,794 | B2 * | 5/2009 | Cook | G01V 15/00 |
| | | | | 385/100 |
| 8,225,875 | B2 * | 7/2012 | Begnaud | H02G 1/10 |
| | | | | 248/55 |
| 8,678,088 | B2 * | 3/2014 | Brown | E21B 41/00 |
| | | | | 166/54.5 |
| 8,942,529 | B2 * | 1/2015 | Auzerais | E21B 17/1035 |
| | | | | 385/114 |
| 9,273,520 | B2 * | 3/2016 | O'Blenes | E21B 19/22 |
| 9,416,598 | B2 | 8/2016 | Birch | |
| 9,557,195 | B2 * | 1/2017 | Barfoot | E21B 47/135 |
| 11,220,870 | B2 * | 1/2022 | Arora | E21B 17/003 |
| 2007/0169929 | A1 * | 7/2007 | Hall | E21B 47/12 |
| | | | | 166/65.1 |
| 2008/0271926 | A1 * | 11/2008 | Coronado | E21B 43/08 |
| | | | | 166/66 |
| 2015/0337605 | A1 * | 11/2015 | Longbottom | C09J 7/29 |
| | | | | 166/380 |
| 2016/0259085 | A1 | 9/2016 | Wilson et al. | |
| 2017/0002645 | A1 | 1/2017 | Jaaskelainen | |

FOREIGN PATENT DOCUMENTS

| | | |
|---|---|---|
| WO | 2017086947 A1 | 5/2017 |
| WO | 2017109467 A1 | 6/2017 |
| WO | 2018048412 A1 | 3/2018 |

OTHER PUBLICATIONS

PCT Application Serial No. PCT/US2018/037633, International Written Opinion, dated Mar. 14, 2019, 5 pages.

* cited by examiner

METHOD FOR INSTALLING FIBER ON PRODUCTION CASING

TECHNICAL FIELD

The present description relates in general to relates generally to methods and systems used for deploying cables downhole, and more specifically (although not necessarily exclusively), to methods and systems for deploying cables downhole on a casing string without the use of clamps, blast protectors, and bulky flatpacks requiring manual application.

BACKGROUND OF THE DISCLOSURE

Sensing cables can be positioned downhole to monitor conditions in a wellbore, including for example temperature, pressure, and acoustics. The sensing cables can be coupled to a casing string or other tubing string and positioned downhole to monitor the conditions in the wellbore. Knowledge regarding the position of the sensing cable can help to prevent damage to the cable during run-in-hole, cementing, and other downhole procedures, for example, but not limited to, perforating holes in a casing string. Sensing cables can be less likely to be damaged when their positions are known with greater accuracy.

Installing the sensing cables on production casing has traditionally been a labor intensive and hardware focused process, using clamps to secure the cables on the casing, and blast protectors and flatpacks to protect the cable, all of which are installed manually, e.g., by hand.

BRIEF DESCRIPTION OF THE DRAWINGS

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

This section provides various example implementations of the subject matter disclosed, which are not exhaustive. As those skilled in the art would realize, the described implementations may be modified without departing from the scope of the present disclosure. Accordingly, the drawings and description are to be regarded as illustrative in nature and not restrictive.

The present description relates in general to downhole tools, and more particularly, for example and without limitation, to methods and systems for deploying optical fiber cables downhole on a casing string without the use of clamps, blast protectors, and flatpacks. The present systems and methods described herein automate the optical fiber installation and deployment process. This eliminates the need for manual labor traditionally employed to install the clamps, blast protectors, and flatpacks traditionally used to secure the optical fiber cables to the casing string during deployment or run-in-hole thereof.

Once a well has been drilled and tested, production casing is installed in the well. This runs from the surface to the bottom of the well, and can be horizontal for a long part of its length to take advantage of the hydrocarbon bearing formation. Fiber telemetry based on optical fiber installed on the outside of the casing is increasingly being used to monitor the performance during the life of the well. Fiber telemetry methods include Distributed Acoustic Sensing (DAS) which detects acoustic changes in the well caused by temperature, fluid flow, and other parameters, and Distributed Temperature Sensing (DTS), which detects temperature changes. Both DAS and DTS are utilized to build up a profile of the wellbore's performance over its entire length for the life of the wellbore.

Figure 1:
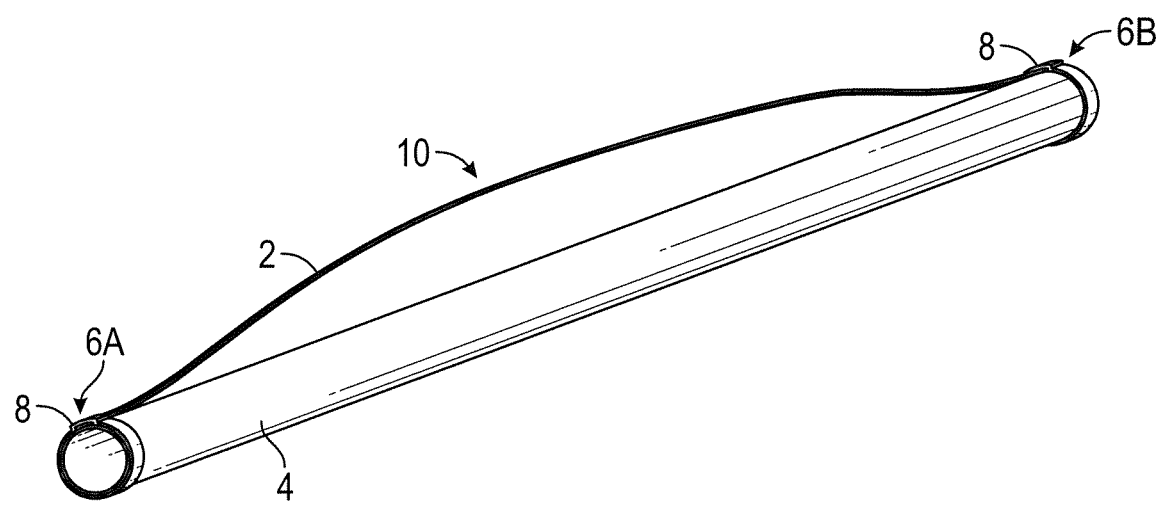
FIG. 1 is a perspective view of a casing assembly illustrating an optical fiber installed on a production casing according to the prior art.

FIG. 1 is a perspective view of a casing assembly 10 illustrating an optical fiber cable 2 installed on a production casing 4 according to the prior art. Installing optical fiber cable 2 on production casing 4 has traditionally been a labor intensive and hardware focused process, using clamps, e.g., clamps 8, and protectors along the length of the casing string that are installed by hand. The clamps 8 are typically installed at each casing joint, e.g., 6A and 6B, which are generally nominally about 30 feet apart. Between the clamps 8, the optical fiber cable 2 relies greatly on line tension to keep it in position resting against the side of the casing 4.

However, in accordance with some embodiments disclosed herein is the realization that, as illustrated in FIG. 1, due to variations in compression of the casing 4 due to gravity, curvature of the well and thermal effects, the optical fiber cable 2 can bow outwards, and away from the casing 4 during run-in-hole (RIH). The bowing renders the optical fiber cable 2 susceptible to damage from the formation as the casing 4 is lowered in the hole, as well as disadvantageously reduces contact with the casing. In order to perform accurate DAS and DTS, proper and uniform contact of the optical fiber cable 2 with the casing 4 is needed for effective signal detection by the DAS and DTS fibers. Once positioned on the bottom of the wellbore, the casing string (formed of a plurality of casings attached to each other at the casing joints 6A and 6B) is cemented in place, and the optical fiber cable is fixed in place as bowed, thereby permanently reducing DAS and DTS signal quality.

Accordingly, a problem addressed by the casing systems and methods disclosed herein is that the reduced DAS and DTS signal quality can cause inaccurate data to be collected over the entire length of the life of the well, and accordingly an inaccurate profile of the wellbore's performance over the life of the wellbore. Further, the present disclosure also addresses another problem in prior casing systems, which is that the number of clamps used to overcome the optical fiber bowing issues associated with conventional optical fiber installation methods per wellbore can run into the high hundreds, thereby adding significantly to installation costs.

Additionally, conventional optical fiber installation methods utilize centralizers to keep the casing 4 centralized and protect the optical fiber cable 2 from wear against the formation during run-in-hole. Accordingly, in accordance with some embodiments disclosed herein is the realization that in order to accommodate the centralizers therein, the wellbore must be drilled to a larger size/diameter, which can also add additional cost.

In a further effort to protect the optical fiber cable from damage, conventional optical fiber installation methods often mold the optical fiber cable into a flat pack with wire cable on each side. In these configurations, a polyethylene or polypropylene sheath can be molded over the cables and line. In accordance with some embodiments disclosed herein is the realization that while this method adds a physical layer of protection, bowing can still occur between clamps, and the molding itself can dampen the optical fiber signal response. There is also a significant cost increase associated with installation/implementation of the flatpack, and the resultant packaging requires larger spools, larger cranes, all of which adds to the total cost of installation.

Thus, in an effort to address all of the aforementioned deficiencies of the prior art, the some embodiments of the present disclosure are directed to providing an optical fiber installation method that reduces costs by eliminating clamps and flatpacks traditionally used, reduces centralizer outer diameter, and reduces rig installation time and crew headcount/labor. Some embodiments of the present disclosure are also directed to providing an optical fiber cable installation method which improves signal quality over the life of the wellbore.

In accordance with some embodiments, a wrapping device is provided for application of the adhesive tape to the casing. The wrapping device may include press rollers to roll over and press the tape onto the casing as the casing is lowered in the wellbore.

Further, in some embodiments, the wrapping device can be configured to linearly press the adhesive tape onto the optical fiber cable along the length of the production casing. This configuration can provide the advantage that the tape allows the optical fiber cable to maintain full contact with the casing over its entire length, which provides the best DAS and DTS signal quality.

In other embodiments, the wrapping device can be configured to wrap the adhesive tape radially or helically over the optical fiber cable and the production casing at predetermined intervals along the length of the production casing. In these embodiments, the pitch at which the tape can be wrapped around the casing is adjustable depending on location in the well and other needs.

In both the linear and the radial/spiral wrapping embodiments, the speed at which the wrapping device applies the tape may be configured to correspond to that at which the casing is run-in-hole.

For example, in the case of the linear wrapping device, the tape may be applied at the same speed at which the casing is run-in-hole. In the case of the radial/spiral wrapping device, the wrapping device can be configured to rotate and apply the tape around the casing at a rotational speed which correlates to the linear speed at which the casing is being run-in-hole. That is, the radial/spiral wrapping device will rotate at a speed greater than the speed at which the casing is run-in-hole.

The linear and radial/spiral wrapping devices described herein provide the advantage of automating the process so as to minimize or eliminate the excessive number of labor hours traditionally employed during conventional optical fiber installation methods where clamps and flatpacks need to be manually applied.

According to some embodiments of the present disclosure, the adhesive tape provides 5 key features: (1) low cost construction, (2) protection of the optical fiber cable, (3) ease of application to the casing, (4) strong bonding to the casing, and (5) intimate contact between the optical fiber cable and the casing—all at high pressure and temperature in an extremely rugged environment. The adhesive tape may include two elements—(1) a hard, durable, yet flexible outer layer, and (2) an inner adhesive layer. In some embodiments, the optical fiber cable may be separately applied to the casing. In other embodiments, the optical fiber cable may be embedded in the adhesive.

In accordance with some embodiments of the present disclosure, an Electro-Acoustic Transducer (EAT) may be embedded in the adhesive tape at regular intervals. The embedded EAT provides the advantage of enabling determination of the radial location of the optical fiber cable so as to prevent shearing of the optical fiber during perforation. By integrating the EAT into the adhesive tape, the orientation of the optical fiber cable can be determined by DAS without the need for a wireline mapping survey. The aforementioned configuration can provide the advantage of potential cost savings of $150,000 or more per well. In some embodiments, the EAT technology can comprise point sensors, a controller, a battery, and/or an acoustic transducer. These elements work together to take a measurement, and convert it to an acoustic signal which can then be transmitted to the DAS fiber cable. The signal can then be detected at the surface with a DAS interrogator and the radial location of the optical fiber cable can then be determined.

Figure 2:
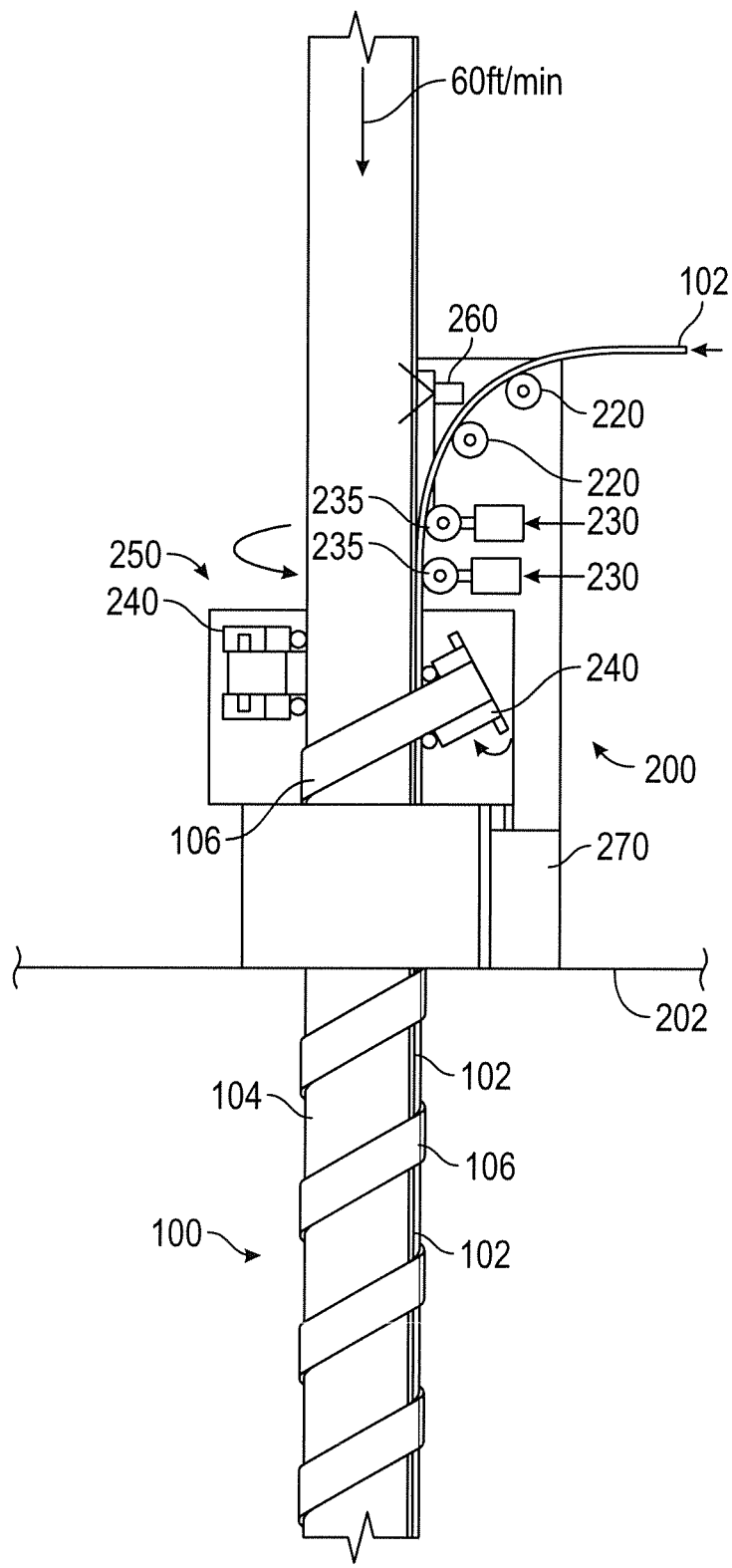
FIG. 2 illustrates a system for securing an optical fiber cable to a production casing, according to some embodiments of the present disclosure.

FIG. 2 illustrates a system 200 for securing an optical fiber cable to a production casing, according to some embodiments of the present disclosure. In some embodiments, the system may include a rotating wrapping device 250 including a tape spool 240 mounted thereto. The wrapping device 250 may be actuated and rotated using an electrical motor 270 or any other source capable of imparting the requisite rotational power.

In operation, the optical fiber cable 102 can be fed from a bulk source, e.g., a cable fiber spool (not shown) off the rig floor 202 and rolled onto an outer surface of the casing 104 using at least one roller 220. As depicted, the optical fiber cable 102 can then be pressed into position against the casing 104 by applying using at least one set of actuators 230 while the casing 104 is being run-in-hole. In some embodiments, the actuators 230 may be hydraulically activated to impart a force against a set of press-rollers 235 which press the optical fiber cable 102 against the casing 104. Once the optical fiber cable 102 is positioned on the casing 104, the wrapping device 250 can rotate the tape spool 240 about the casing 104, and the adhesive tape 106 can be dispensed and wrapped over the optical fiber cable 102 as the casing is run-in-hole. As the wrapping device 250 wraps the adhesive tape 106 around the casing 104, it can simultaneously apply pressure to the tape 106 to adhesively bond the optical fiber cable 102 to the production casing 104 along the length of the production casing 104 while the casing 104 is being run-in-hole. In this way, the adhesive tape 106 can affix the optical fiber cable 102 securely against the casing 104. In accordance with some embodiments, as shall be described in further detail below, the wrapping device 250 may wrap the adhesive tape 106 over the casing in either a spiral configuration, a configuration of a series of radial bands spaced apart from each other, or a combination of both. The rotating wrapping device 250 described herein can provide the advantage of automating the process so as to minimize or eliminate the excessive number of labor hours traditionally employed during conventional optical fiber installation methods where clamps and flatpacks need to be manually applied.

Figure 3:
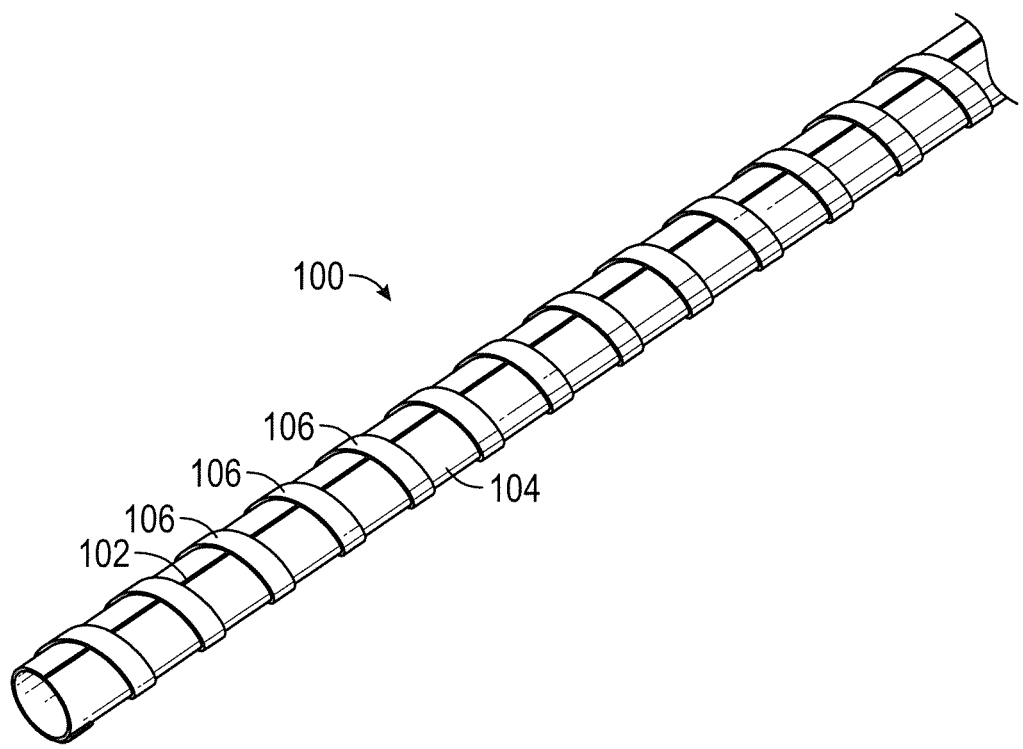
FIG. 3 is a perspective view of a casing assembly illustrating the optical fiber cable secured to the production casing of FIG. 2 using an adhesive tape applied in a helical configuration, according to some embodiments of the present disclosure.

FIG. 3 is a perspective view of a casing assembly 100 illustrating the optical fiber cable 102 secured to the production casing 104 of FIG. 2 using an adhesive tape 106 applied in a helical configuration, according to some embodiments of the present disclosure.

As depicted in FIGS. 2 and 3, the wrapping device 250 can affix the optical fiber cable 102 against the production casing by wrapping the adhesive tape 106 over the optical fiber cable 102 and the production casing 104 in a helical configuration along the length of the production casing 104. In accordance with some embodiments, the production casing 104 can be run-in-hole at a predetermined speed.

As depicted in FIG. 2, the casing 104 can be run-in-hole at a speed of 60 ft/min; however, some embodiments described herein are not limited to this configuration. For example, the speed at which the casing 104 can be run-in-hole may range from about 0-100 ft/min, more specifically 20-90 ft/min, 30-80 ft/min, 40-70 ft/min, 50-60 ft/min, or in some cases approximately 60 ft/min. For example, in some embodiments, the starting speed of the casing 104 may be 0ft/min, which may then increase to 60 ft/min as the casing is run further downhole, and be reduced back to 0ft/min as the casing 104 reaches the target setting depth downhole. Though recited in terms of certain ranges, it will be understood that all ranges from the lowest of the lower limits to the highest of the upper limits are included, including all intermediate ranges or specific speeds, within this full range or any specifically recited range.

In accordance with some embodiments, the rotating wrapping device 250 may wrap the adhesive tape 106 over the optical fiber cable 102 and around the production casing 104 at a speed correlating to the speed at which the casing 104 is run-in-hole. To this effect, a velocity measuring device, e.g., velocimeter 260 may be operatively coupled to the casing 104 to measure the speed of the casing 104 as it is run-in-hole. Once the speed at which the casing is being run-in-hole is determined, the wrapping device 250 may be controlled so that the adhesive tape spool 240 feeds the tape 106 at a rate correlating to that of the casing 104. In some embodiments, the velocimeter 260 may use ultrasonic or any other suitable means of speed detection. Due to the fact that the wrapping device 250 rotates around the casing 104, the speed at which the wrapping device 250 affixes the adhesive tape 106 to casing 104 can be greater than the speed at which the casing is run-in-hole.

For example, in order for the speed at which the rotating wrapping device 250 to correlate to the speed at which the casing 104 is run-in-hole, the wrapping device 250 would rotate at about 3 times the speed at which the casing 104 is run-in-hole. However, some embodiments described herein are not limited to this configuration. For example, where vertical speeds of running the casing in the hole can be up to 60 ft/minute, over a 30 ft casing length, the wrapping device 250 would be able to spin around the casing 104 at least 120 rpm, depending on the pitch required. In some embodiments, additional overlapping wraps can be added while casings are joined to form the casing string, and can be mixed with radial bands and helical spirals of adhesive tape.

In some embodiments the adhesive tape 106 may be wrapped over the optical fiber cable 102 and the production casing 104 at a first helical pitch. As the casing 104 is being run-in-hole, the pitch may be adjusted to a second helical pitch depending on location in the well and other needs. For example, the pitch of the wrapped adhesive tape may be adjusted from a 12 inch in a first section of the casing 104 pitch down to a 6 inch pitch in a second section of the casing 104. However, some embodiments of the present disclosure are not limited thereto. In some embodiments, the pitch of the wrapped adhesive tape 106 may be reduced to a point where the adhesive tape 106 is continuously overlapping. In yet other embodiments, an adhesive tape having a greater width can be used for full overlap.

Figure 4:
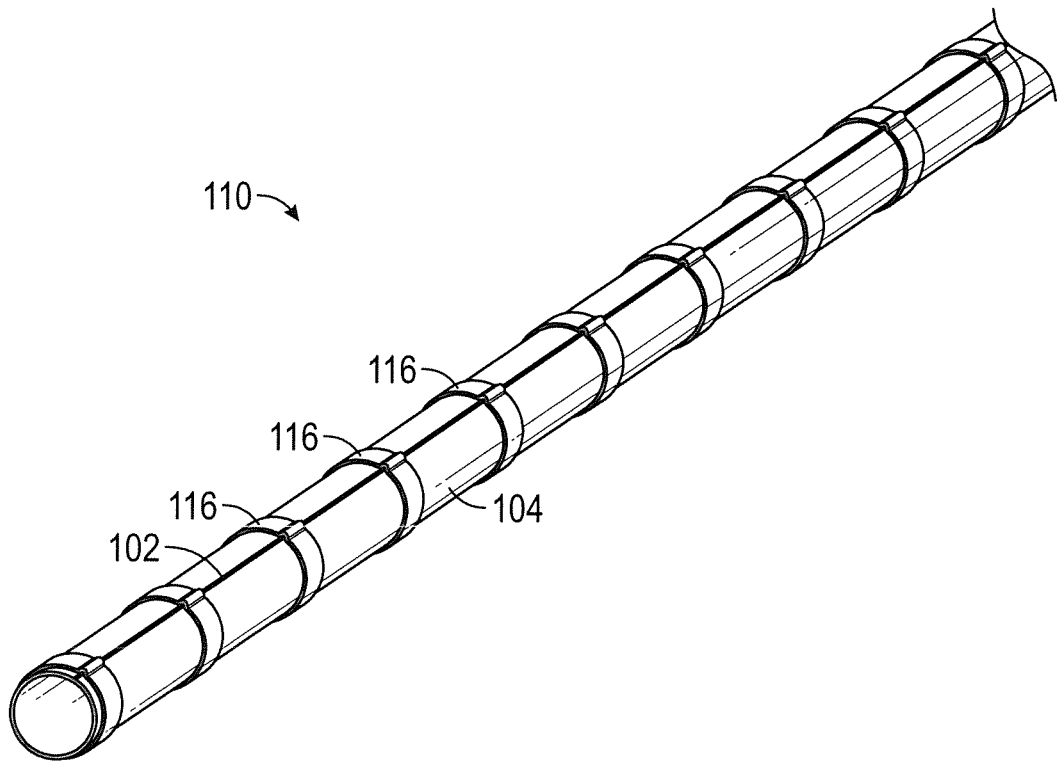
FIG. 4 is a perspective view of a casing assembly illustrating the optical fiber cable secured to the production casing of FIG. 2 using an adhesive tape applied in a radial configuration, according to some embodiments of the present disclosure.

FIG. 4 is a perspective view of a casing assembly 110 illustrating the optical fiber cable 102 secured to the production casing 104 of FIG. 2 using an adhesive tape 116 applied in a radial configuration, according to some embodiments of the present disclosure. As depicted in FIG. 4, the wrapping device 250 (shown in FIG. 2) can affix the optical fiber cable 102 against the production casing by wrapping the adhesive tape 106 over the optical fiber cable 102 and the production casing 104 in a series of radial bands along the length of the production casing 104. In the depicted embodiment, the bands of adhesive tape 116 are wound around the casing 104 and spaced apart from each other at regular intervals. In some embodiments, this would require the casing 104 to be stopped momentarily after wrapping of each radial band of tape 116 about the circumference of the casing 104. Once wrapping of the radial band of tape 116 is completed, lowering of the casing downhole can be re-commenced, and the process would continue as described above for wrapping of additional radial bands.

In accordance with some embodiments, the production casing 104 can be run-in-hole at a predetermined speed. Similar to the embodiments described above with respect to the embodiments illustrated in FIG. 2, the casing 104 may be run-in-hole at a predetermined speed, for example 60 ft/min. However, some embodiments described herein are not limited to this configuration. For example, the speed at which the casing 104 is run-in-hole may range from about 20-100 ft/min, more specifically 30-90 ft/min, 40-80 ft/min, 50-70 ft/min, or in some cases approximately 60 ft/min. Though recited in terms of certain ranges, it will be understood that all ranges from the lowest of the lower limits to the highest of the upper limits are included, including all intermediate ranges or specific speeds, within this full range or any specifically recited range.

Similar to the configuration in which the adhesive tape is helically wrapped, the rotating wrapping device 250 (shown in FIG. 2) may wrap the adhesive tape 116 over the optical fiber cable 102 and around the production casing 104 at a speed correlating to the speed at which the casing 104 is run-in-hole. To this effect, the velocimeter 260 (shown in FIG. 2) may be operatively coupled to the casing 104 to measure the speed of the casing 104 as it is run-in-hole. In some embodiments, as illustrated in FIG. 2, the velocimeter 260 may be located on the wrapping device 250. In other embodiments, the velocimeter 260 may be located remotely from, and wirelessly communicated with the wrapping device 250. For example, the wrapping device 250 may be mounted to the derrick (not shown), or attached to a rig depth measuring system (not shown), and wirelessly communicated with the velocimeter 260 using for example, infrared, or radar communication. The rig depth measuring system may be a cable attached to a drawworks (not shown) that passes over the top of the derrick to a retriever in a driller's cabin, and that has its own sensor for measuring depth. Once the speed at which the casing 104 is being run-in-hole is determined, the wrapping device 250 (shown in FIG. 2) may be controlled so that the adhesive tape spool 240 (shown in FIG. 2) feeds the tape 116 at a rate correlating to that of the casing 104. In some embodiments, additional overlapping wraps can be added while subsequent casings 104 are joined to form the casing string, and can be mixed with radial bands and helical spirals of adhesive tape 116.

Figure 5:
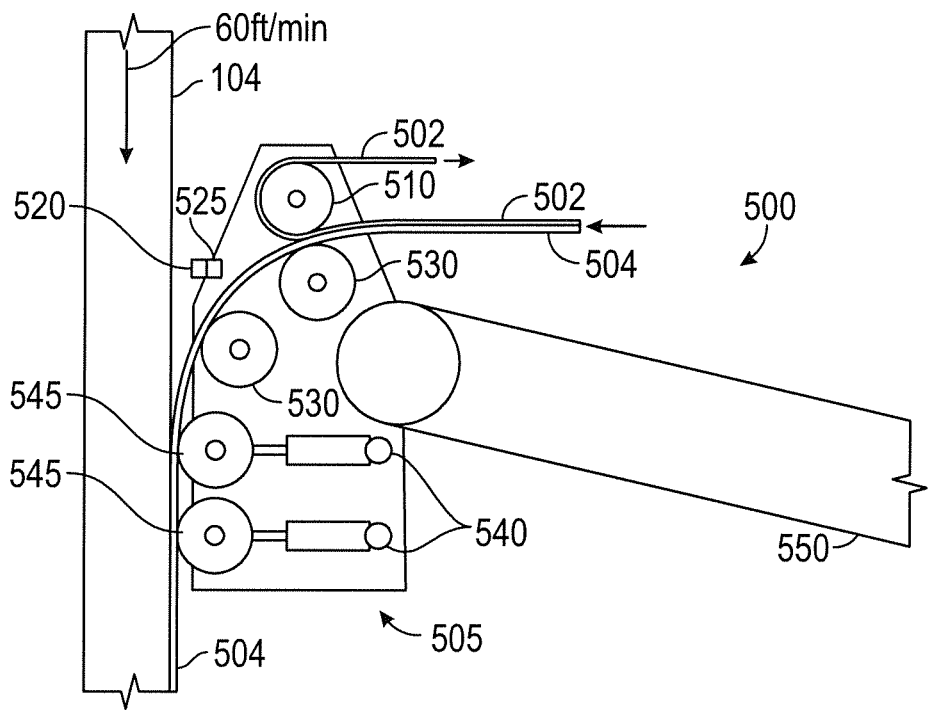
FIG. 5 illustrates a system for securing an optical fiber cable to a production casing, according to some embodiments of the present disclosure.

FIG. 5 illustrates a system 500 for securing an optical fiber cable 102 to a production casing, according to some embodiments of the present disclosure. In some embodiments, the system 500 may include a linear wrapping device 505 which may be integrated into a modified set of spider slips (not shown) which allows the optical fiber cable 102 to first be applied to the casing 104, followed by linear application of the adhesive tape 504, and finally run-in-hole for the subsequent section of casing 104.

For example, the adhesive tape 504 may be affixed to the casing 104 substantially parallel relative to a longitudinal axis of the casing 104. In some embodiments, as depicted in FIG. 5, the optical fiber cable may be pre-imbedded in the adhesive tape 504. In these embodiments, the adhesive tape 504 with the optical fiber cable embedded therein may be fed in bulk from a spool (not shown) off the rig floor to the wrapping device 505 which is held in place to the casing 104 by a self-adjusting support arm 550. In some embodiments, the self-adjusting support arm 550 may extend from a truck (not shown) containing the spools of optical cable fiber and adhesive tape, to the wrapping device 505. For example, the self-adjusting support arm 550 may be controlled from a bed of the truck, which may have a control cabin (not shown). The control cabin may include a controller and hydraulics for adjusting motion of the self-adjusting support arm 550 to cause the wrapping device 505 to match the speed at which the casing 104 is run-in-hole. However, some embodiments described herein are not limited to the aforementioned configuration. In some embodiments, similar to those illustrated in FIG. 2, the optical fiber and the adhesive tape may be separately applied to the casing.

Figure 7:
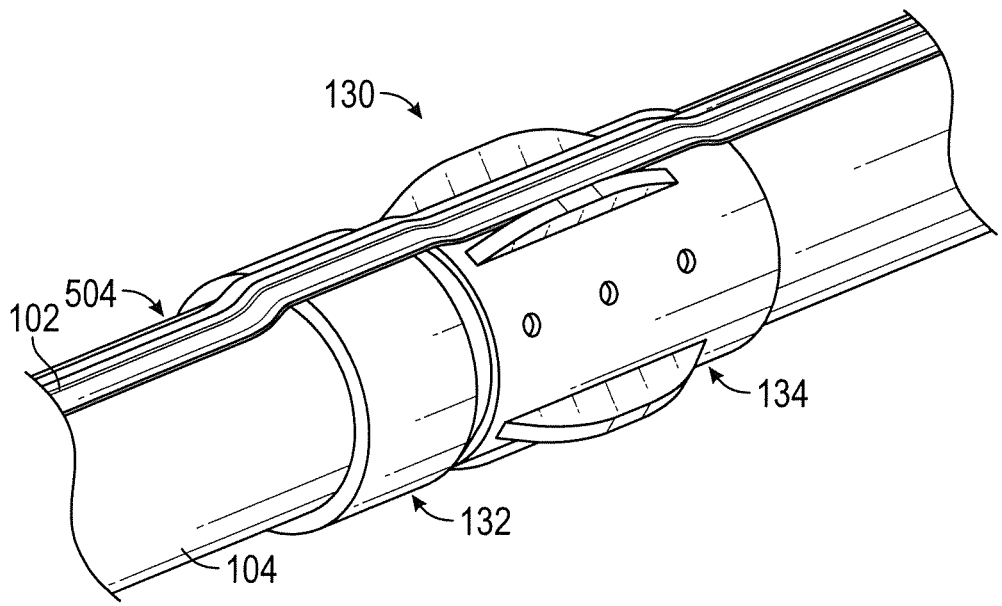
FIG. 7 is a perspective view illustrating the adhesive tape applied in a linear configuration over the optical fiber in an area of an upset joint, according to some embodiments of the present disclosure.

In some embodiments, the wrapping device 505 may include a profile measuring device, e.g., a profilometer 520 positioned thereon so as to measure a surface profile of the casing 104 or the casing string (comprised of a plurality of casings 104 joined together) to detect abnormalities or discontinuities in the profile of the casing 104 and/or casing string. The abnormalities or discontinuities may include for example, protrusions, centralizers, or upset joints 132 (as illustrated in FIG. 7). To this effect, the profilometer 520 may use stereo cameras, ultrasonics, or other suitable distance/profile measuring techniques to determine the surface profile of the casing 104. The surface profile measurements/data obtained may then be used to control hydraulic force actuators 540 back and forth so the adhesive tape with the pre-embedded optical fiber cable is distributed evenly over the abnormalities.

In operation, the optical fiber cable embedded adhesive tape 504 can be fed from a bulk source, e.g., an adhesive tape spool (not shown) off the rig floor, and rolled onto an outer surface of the casing 104 using at least one feed roller 530. As depicted, the optical fiber cable embedded adhesive tape 504 can then be pressed into position against the casing 104 using at least one set of actuators 540 while the casing 104 is being run-in-hole. In some embodiments, the actuators 540 may be hydraulically activated to impart a force against a set of press-rollers 545 which press the optical fiber cable embedded adhesive tape 504 against the casing 104.

Once the optical fiber cable embedded adhesive tape 504 is positioned on the casing 104, the wrapping device 505 can roll the optical fiber cable embedded adhesive tape 504 linearly onto the casing 104, as the casing 104 is run-in-hole. As the wrapping device 505 rolls the optical fiber cable embedded adhesive tape 504 onto the casing 104, it can simultaneously apply pressure to the optical fiber cable embedded adhesive tape 504. This can adhesively bond the optical fiber cable embedded adhesive tape 504 to the production casing 104 along the length of the production casing 104 while the casing 104 is being run-in-hole. In this way, the optical fiber cable can be affixed securely against the casing 104.

In some embodiments, the optical fiber cable embedded adhesive tape 504 may have a protective cover 502 covering the adhesive portion (e.g., adhesive layer 125 illustrated in FIGS. 9A-9C) to prevent the adhesive portion sticking to itself. The protective cover 502 may further prevent dirt or other impurities from compromising the strength of the adhesive layer 125. As depicted, as the optical fiber cable embedded adhesive tape 504 is fed into the wrapping device 505, the protective cover 502 of the tape can be removed by being gripped and rolled onto a dispensing roller 510 and fed back to a take up spool (not shown) for later disposal. To this effect, the dispensing roller 510 may be configured to rotate in a direction opposite to that of the feed roller 530. Once the protective cover 502 is removed, the adhesive portion is exposed to the casing 104. As the casing 104 is lowered further downhole, the adhesive tape 504 can be pressed onto the casing 104 using the force actuators 540 which apply a constant force to the adhesive tape 504 to ensure solid mating with the outer surface of the casing 104.

The linear wrapping device described herein provides the advantage of automating the process so as to minimize or eliminate the excessive number of labor hours traditionally employed during conventional optical fiber installation methods where clamps and flatpacks need to be manually applied. Further, the wrapping device 505 can wrap the adhesive tape 504 linearly along the length of the casing 104 (as discussed in further detail below) and use less tape to secure the optical fiber cable on the casing.

Figure 6:
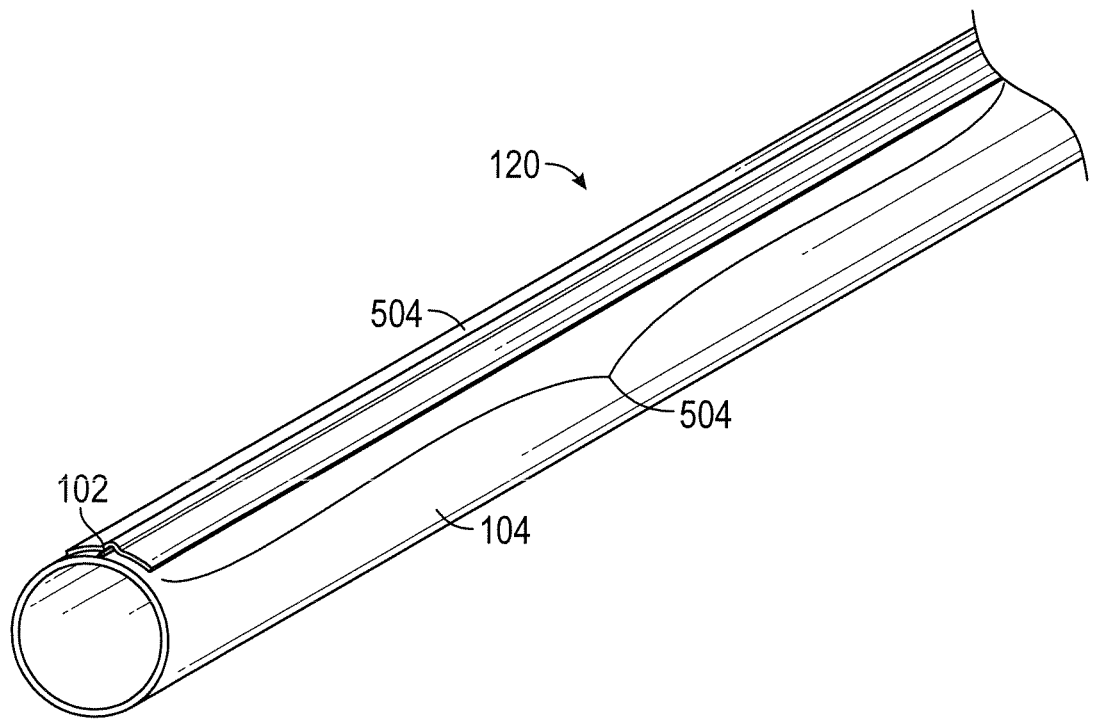
FIG. 6 is a perspective view of a casing assembly illustrating the optical fiber cable secured to the production casing of FIG. 5 using an adhesive tape applied in a linear configuration, according to some embodiments of the present disclosure.

FIG. 6 is a perspective view of a casing assembly 120 illustrating the optical fiber cable 102 secured to the production casing 104 of FIG. 5 using an adhesive tape 504 applied in a linear configuration, according to some embodiments of the present disclosure. FIG. 7 is a perspective view illustrating the adhesive tape 504 applied in a linear configuration over the optical fiber cable 102 in an area of an upset joint 132, according to some embodiments of the present disclosure. In accordance with some embodiments. As depicted in FIGS. 5 and 6, the wrapping device 250 affixes the optical fiber cable embedded adhesive tape 504 against the production casing by rolling the optical fiber cable embedded adhesive tape 504 over the production casing 104 in a linear configuration along the length of the production casing 104.

For example, as depicted, the optical fiber cable embedded adhesive tape 504 can be applied substantially parallel relative to a longitudinal axis of the production casing 104. In accordance with some embodiments, the production casing 104 can be run-in-hole at a predetermined speed.

Referring back to FIG. 5, the casing 104 can be run-in-hole at a speed of 60 ft/min; however, some embodiments described herein are not limited to this configuration. For example, the speed at which the casing 104 is run-in-hole may range from about 20-100 ft/min, more specifically 30-90 ft/min, 40-80 ft/min, 50-70 ft/min, or in some cases approximately 60 ft/min. For example, in some embodiments, the starting speed of the casing 104 may be 0ft/min, which may then increase to 60 ft/min as the casing is run further downhole, and be reduced back to 0ft/min as the casing 104 reaches the target setting depth downhole. Though recited in terms of certain ranges, it will be understood that all ranges from the lowest of the lower limits to the highest of the upper limits are included, including all intermediate ranges or specific speeds, within this full range or any specifically recited range.

In accordance with some embodiments, the wrapping device 505 may wrap the optical fiber embedded adhesive tape 504 onto, and along the length of the production casing 104 at a speed matching the speed at which the casing 104 is run-in-hole. To this effect, the wrapping device 505 may include a velocimeter 525 to measure the speed of the casing 104 as it is run-in-hole, so as to match the speed at which the optical fiber embedded adhesive tape 504 can be affixed to the casing 104. Once the speed at which the casing 104 is being run-in-hole is determined, the wrapping device 505 may be controlled, (e.g., by a controller of the device configured to execute programmed instructions) apply the optical fiber embedded adhesive tape 504 at a speed correlating to that of the casing 104. In some embodiments, the velocimeter 525 may use ultrasonic or any other suitable means of speed detection. When the casing 104 is stopped to make up another joint, the adhesive tape spool (not shown) can be stopped by the velocimeter 525. Once the joint is made up, application of the adhesive tape 504 resumes.

Advantageously, due to the fact that the tape is wrapped in a linear manner as opposed to a helical or radial configuration, the adhesive tape 504 provides full contact of the embedded (or separate) optical fiber cable with the casing 104 over the entire length of the casing 104, thereby providing the best signal quality. Further, because some embodiments of the wrapping device 505 can be linear, which do not need to rotate, the wrapping device can more easily match the speed of the casing 104 as it is run-in-hole.

As illustrated in FIG. 7, the adhesive tape 504 may be applied over an abnormality which causes a change in profile of the casing, e.g., an upset joint 132, or a stabilizer 134 which can be used, for example, to stiffen the casing string. In these embodiments, the wrapping device 505 may include a profilometer 520 positioned thereon so as to measure a surface profile of the casing 104 or the casing string to detect the upset joint 132 or the stabilizer 134. To this effect, the profilometer 520 may use stereo cameras, ultrasonics, or other suitable distance/profile measuring techniques to determine location of the upset joint 132 or the stabilizer 134. The profile measurements/data obtained relating to the upset joint 132 or the stabilizer 134 may then be used to control the hydraulic force actuators 540 back and forth so the adhesive tape with the pre-embedded optical fiber cable 504 can be distributed evenly over the abnormalities.

Figure 8:
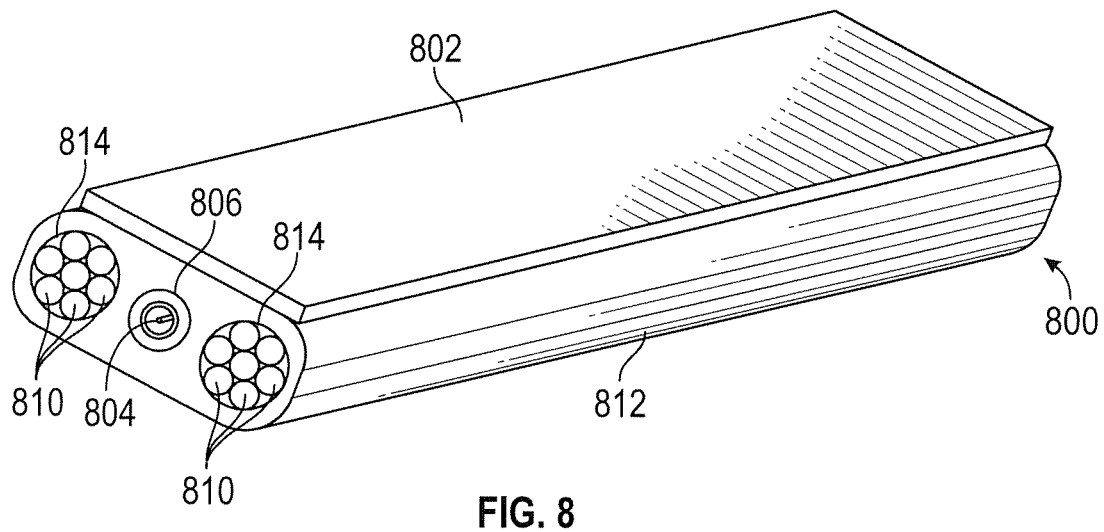
FIG. 8 is a perspective view illustrating a slim flatpack having an optical fiber cable mounted therein, and an adhesive layer for attaching to a casing, according to some embodiments of the present disclosure.

FIG. 8 is a perspective view illustrating a slim flatpack 800 having an optical fiber cable 804 mounted therein, and an adhesive layer 802 for attaching to a casing 104, according to some embodiments of the present disclosure.

As illustrated in FIG. 8, the optical fiber cable 804 may be mounted in the protective flatpack 800 so as to minimize damage to the optical fiber cable 804 as the casing 104 (illustrated respectively in FIGS. 2 and 5) is run-in-hole. In some embodiments, a polyethylene or polypropylene sheath may be molded over the optical fiber cable 804 to provide an extra layer of protection for the optical fiber cable 804.

As depicted, the flatpack 800 may include a hollow tubing 806 extending longitudinally through the body 812 of the flatpack 800, and an adhesive layer 802 for affixing the body 812 of the flatpack 800 to the casing 104. The optical fiber cable 804 may be positioned in the tubing 806, and mounted to the casing 104 by affixing adhesive layer 802 of the flatpack 800 to the casing 104.

In some embodiments, the flatpack 800 may be mounted on the casing 104 in a similar manner as the adhesive tape 504 is applied to the casing 104. For example, the flatpack 800 with the optical fiber cable 804 mounted therein may be fed from a spool (not shown) off the rig floor to the wrapping device 505.

In accordance with some embodiments, the body 812 of the flatpack 800 may be in the form of a slim jacket having an adhesive layer 802 on one side thereof for adhering the slim flatpack 800 to the casing 104. As such, the slim flatpack 800 may range in thickness from about ⅛ inch to ¾ inch. Though recited in terms of a certain range, it will be understood that all values from the lowest of the lower limits to the highest of the upper limits are included, including all intermediate ranges or specific thicknesses, within this full range or any specifically recited range. In some embodiments, the slim flatpack 800 may be formed of a flexible material capable of bending to match the curvature of the casing 104 to which it is adhered. For example, the body 812 of the slim flatpack 800 may be formed of a plastic molding. As such, the body 812 may be formed of a tough flexible high density plastic material, for example, a polyurethane or a polypropylene material. In other embodiments, the slim flatpack 800 may have a concave section (not shown) to match the curvature of the casing 104 to which it is adhered.

In some embodiments, the slim flatpack 800 may further include multiple sensing cables mounted therein, and extending along a length of the slim flatpack 800. As such, the slim flatpack 800 may include at least one additional tubing 814, disposed adjacent to tubing 806, with a plurality of cables 810 mounted in the tubing 814. For example, the cables 810 may be sensing cables (e.g., electrical, optical, and hydraulic sensing cables), wire ropes, protective steel cables, or other solid metal objects for protection. As depicted, the slim flatpack 800 includes two additional tubings 814; however the various embodiments of the present disclosure are not limited thereto. In some embodiments, there may be multiple tubings 814 for containing different cables 810. Similar to the optical fiber cable 804, a polyethylene or polypropylene sheath may be molded over the sensing cables 810.

The slim flatpack 800 of the various embodiments described herein provides the advantage of having a smaller thickness, and a correspondingly slimmer structure than conventional flatpacks employed during conventional optical fiber installation methods. Advantageously, the slimmer flatpack structure yields a significant cost reduction associated with installation/implementation of the flatpack, as the resultant packaging utilizes smaller spools, smaller cranes, all of which adds to the reduction in total cost of installation. Further, the wrapping device 505 of the various embodiments described herein provides the advantage of automating the process so as to minimize or eliminate the excessive number of labor hours traditionally employed during conventional optical fiber installation methods where the flatpacks need to be manually applied.

In operation, the slim flatpack 800 can be fed from a spool (not shown) off the rig floor, and rolled onto an outer surface of the casing 104 using the feed roller 530 (illustrated in FIG. 5). Similar to the adhesive tape 504 of FIG. 5, the slim flatpack 800 can then be pressed into position against the casing 104 using the actuators 540 while the casing 104 is being run-in-hole. In some embodiments, the actuators 540 may be hydraulically activated to impart a force against a set of press-rollers 545 which press the slim flatpack 800 having the optical fiber cable mounted therein, against the casing 104. Once the slim flatpack 800 is positioned on the casing 104, the wrapping device 505 can roll the slim flatpack 800 onto the casing 104, as the casing 104 is run-in-hole. As the wrapping device 505 rolls the slim flatpack 800 onto the casing 104, it can simultaneously apply pressure to the slim flatpack 800. This can adhesively bond the slim flatpack 800 to the production casing 104 along the length of the production casing 104 while the casing 104 is being run-in-hole. In this way, the optical fiber cable can be mounted to the casing 104 by securely affixing the slim flatpack 800 against the casing 104.

In some embodiments, similar to the adhesive tape 504, the slim flatpack 800 may have a protective cover (not shown) covering the adhesive layer 802 to prevent dirt or other impurities from compromising the strength of the adhesive layer 802. As the slim flatpack 800 is fed into the wrapping device 505, the protective cover of the tape can be removed by being gripped and rolled onto the dispensing roller 510 and fed back to a take up spool (not shown) for later disposal.

In accordance with some embodiments, the adhesive layer 802 may be thermally, mechanically or chemically activated. To this effect, the adhesive layer 802 may be formed of a pressure sensitive putty-like material.

For example, the adhesive layer 802 may be a pressure sensitive putty-like ceramic, and in some instances, specifically a carbon fiber ceramic epoxy. The pressure sensitive putty of the adhesive layer 802 can create initial adhesion, and as it moves downhole, pressure and temperature cause the adhesive layer 802 to harden into an extremely strong bond with the casing 104. The result yields the advantage of providing an extremely strong and intimate bond of the adhesive layer 802 with the casing 104. The greater the temperature and pressure downhole, the stronger the bond. In some embodiments, the pressure-sensitive material may be capable of withstanding pressures up to, for example, 20,000 psi, and temperatures up to, for example, 200° C.

Figure 9A:
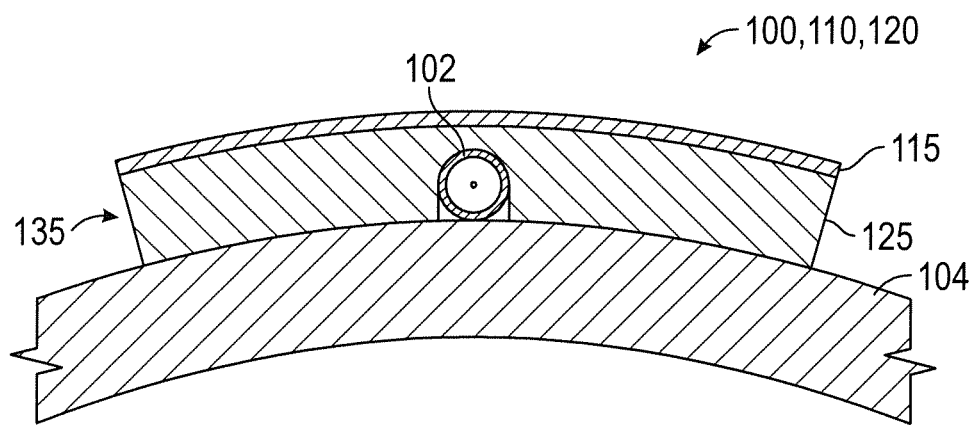
FIG. 9A is a partial cross-sectional view illustrating the optical fiber cable secured to the production casing using a thick adhesive tape, according to some embodiments of the present disclosure.
Figure 9B:
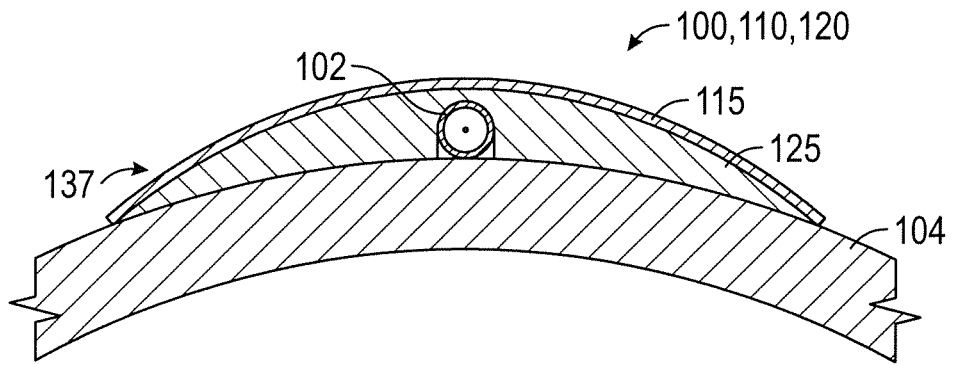
FIG. 9B is a partial cross-sectional view illustrating the optical fiber cable secured to the production casing using a tapered adhesive tape, according to some embodiments of the present disclosure.
Figure 9C:
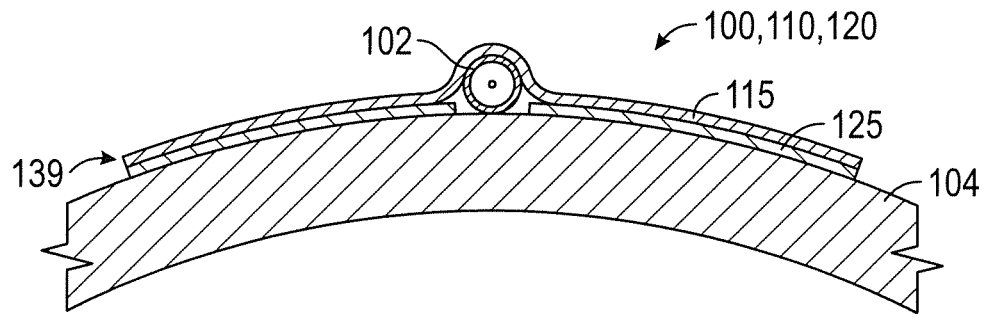
FIG. 9C is a partial cross-sectional view illustrating the optical fiber cable secured to the production casing using a thin adhesive tape, according to some embodiments of the present disclosure.

FIG. 9A is a partial cross-sectional view of a casing assembly 100, 110, 120 illustrating the optical fiber cable 102 secured to the production casing 104 using a thick adhesive tape 135, according to some embodiments of the present disclosure. FIG. 9B is a partial cross-sectional view of the casing assembly 100, 110, 120 illustrating the optical fiber cable 102 secured to the production casing 104 using a tapered adhesive tape 137, according to some embodiments of the present disclosure. FIG. 9C is a partial cross-sectional view of a casing assembly 100, 110, 120 illustrating the optical fiber cable 102 secured to the production casing 104 using a thin adhesive tape 139, according to some embodiments of the present disclosure. As depicted in FIGS. 9A-9C, the adhesive tape 135, 137, 139 may take several forms. As illustrated in FIG. 9A, the adhesive tape 135 may be of a thick layer, which can be even in cross-sectional thickness. In other embodiments, as illustrated in FIG. 9B, the adhesive tape 137 may be thickest in cross-section in a middle portion thereof, and taper off to a reduced thickness on opposing end portions thereof. In yet other embodiments, as illustrated in FIG. 9C, the adhesive tape 139 may be a thin layer, even in cross-sectional thickness, yet having a reduced thickness as compared with the thick layer of FIG. 9A. For example, the adhesive tape 135, 137, 139 may range in thickness from about 0.005 inches to about 0.35 inches. In some embodiments, the thin adhesive tape 139 may range in thickness from about 0.005 inches to about 0.125 inches, and the thick adhesive tape 135 may range in thickness from about 0.125 inches to about 0.35 inches. In some embodiments, the adhesive tape 135, 137, 139 may vary in width from about 1 inch to about 4 inches. In yet other embodiments, for example in the case of the helical spiral or radial band wrapped tape configurations (illustrated in FIGS. 3 and 4), the width of the adhesive tape 135, 137, 139 may measure up to 12 inches to provide full overlap of the adhesive tape around the casing 104. Though recited in terms of certain ranges, it will be understood that all ranges from the lowest of the lower limits to the highest of the upper limits are included, including all intermediate ranges or specific thicknesses and widths, within these full ranges or any specifically recited ranges.

In accordance with some embodiments, as illustrated in FIGS. 9A-9C, the adhesive tape 135, 137, 139 may include two elements—(1) a hard, durable, yet flexible outer layer 115, and (2) an inner adhesive layer 125. For example, the outer layer may be a steel, carbon or Kevlar ribbon with embedded thermoset resin. In some embodiments, the outer layer may include a combination of the aforementioned steel, carbon and Kevlar materials. The outer layer 115 may be configured to flexible enough to be wrapped around an outer diameter of the casing 104. In some embodiments, the inner adhesive layer 125 may be formed of a pressure sensitive putty-like material. For example, the adhesive layer 125 may be a pressure sensitive putty-like ceramic, and in some instances, specifically a carbon fiber ceramic epoxy.

The pressure sensitive putty of the adhesive layer 125 can create initial adhesion, and as it moves downhole, pressure and temperature cause the adhesive layer 125 to harden into an extremely strong bond with the casing 104. In some embodiments, the embedded thermoset in the outer layer 115 can also be activated by the temperature and cure to a very hard finish. The result yields the advantage of providing an extremely strong and intimate bond of the adhesive layer 125 with the casing 104. The greater the temperature and pressure downhole, the stronger the bond. In accordance with some embodiments, the adhesive layer will be farmed of a pressure-sensitive material capable of withstanding pressures up to, for example, 20,000 psi, and temperatures up to, for example, 200° C. As pressure and temperature increase downhole, the adhesive layer 125 can be further activated by the increased pressure and temperature, and cures to unify the optical fiber cable to the casing, and form a very hard, durable layer that is impenetrable. In some embodiments, the optical fiber cable 102 may be separately applied to the casing 104. In other embodiments, the optical fiber cable 102 may be embedded in the adhesive layer 125 of the tape 135, 137, 139 prior to applying the adhesive tape over the casing 104. Thus, the adhesive tape provides 5 key features: (1) low cost construction, (2) protection of the optical fiber cable, (3) ease of application to the casing, (4) strong bonding to the casing, and (5) intimate contact between the optical fiber cable and the casing—all at high pressure and temperature in an extremely rugged environment.

In some embodiments, the optical fiber cable 102 may be stainless steel tube of about one eighth of an inch in diameter with multiple fiber lines inside the one eighth of an inch tube. For example, multiple fiber lines may include DAS and DTS fiber lines for determining profile of the wellbore over time. However, some embodiments are not limited to the aforementioned configuration, and the tubing of the optical fiber cable 102 may vary in diameter based on the specific application.

Figure 10:
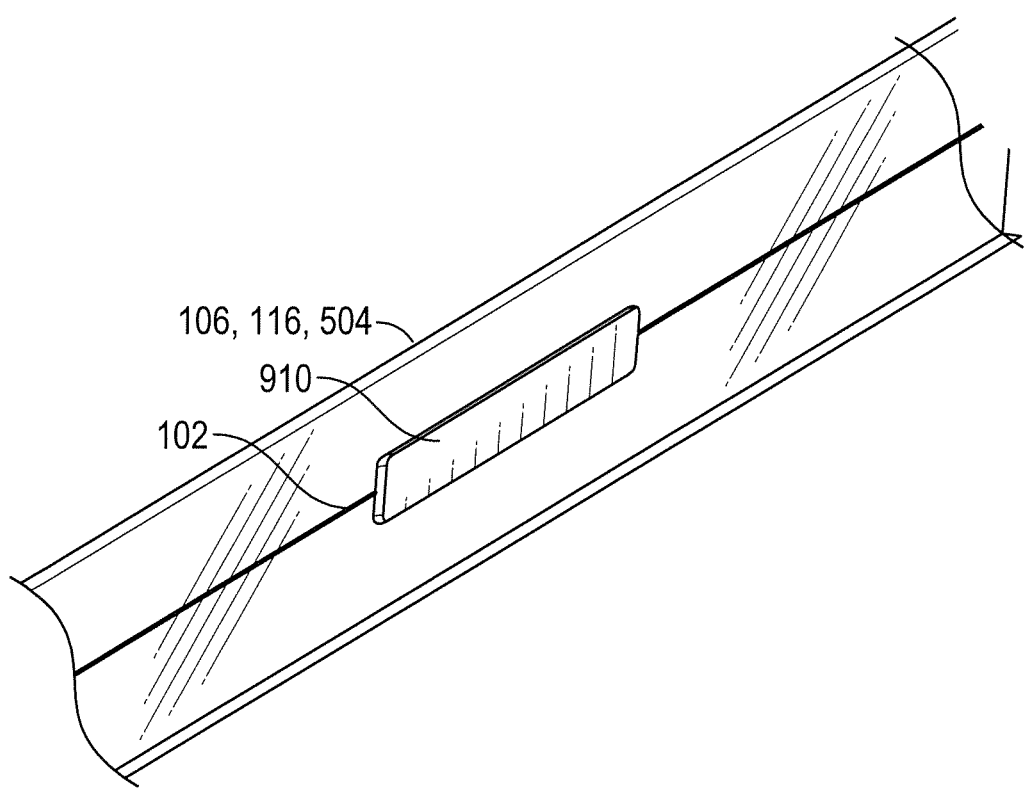
FIG. 10 is a perspective view of an Electro-Acoustic Transducer (EAT) embedded in the adhesive tape, according to some embodiments of the present disclosure.

FIG. 10 is a partial perspective view of an Electro-Acoustic Transducer (EAT) 910 embedded in the adhesive tape 106, 116, 504, according to some embodiments of the present disclosure. As depicted in FIG. 10, the EAT 910 may be embedded in the adhesive tape 106, 116, 504 at regular intervals. The embedded EAT 910 provides the advantage of enabling determination of the radial location of the optical fiber cable 102 so as to prevent shearing of the optical fiber cable 102 during perforation. As described above, the optical fiber cable 102 may be a tube with multiple fiber lines running inside the tube. For example, the multiple fiber lines may include DAS and DTS fiber lines for determining profile of the wellbore over time. By integrating the EAT 910 into the adhesive tape 106, 116, 504, the orientation of the optical fiber cable 102 can be determined by the DAS fiber lines without the need for a wireline mapping survey. The aforementioned configuration provides the advantage of potential cost savings of $150,000 or more per well. In some embodiments, the EAT 910 can comprise point sensors, a controller, a power source, e.g., a battery, and a transducer (not shown). These elements can work together to take a measurement and convert it to an acoustic signal which can then be transmitted to the DAS fiber line. The signal can then be detected at the surface with a DAS interrogator and the radial location of the optical fiber cable 102 is then determined.

As depicted in FIG. 10, each EAT 910 may be configured to emit a wireless signal. The signal may preferably be an acoustic signal or a mechanical signal, e.g., vibrations. As briefly described above, each EAT 910 may include a sensor and controller (not shown) to adjust and customize the wireless signal, and a power source to provide power as necessary. Although not limited to a particular type of transducer so long as an acoustic or mechanical signal can be generated, in one or more embodiments, transducer may be piezoelectric transducer (PZT). The sensor may be electrically coupled to the transducer. As such, electrical responses from sensor may be converted to a wireless signal by the transducer. In this regard, the sensor may not be limited to a particular type of sensor. In non-limiting examples, the sensor may be a temperature sensor, a pressure sensor, geophone, chemical sensor, optical sensor (such as an integrated computational element sensor), load ceil, strain gauge, accelerometer, piezoelectric transducer, radiation sensor or the like. As such, a condition associated with the wellbore, such as temperature, pressure, object orientation, cement curing, may be measured by the sensor and converted by the transducer (and conditioned by controller as desired) into a wireless signal that may be transmitted to the surface. For example, in some embodiments, the transducer may be an electro-acoustic transducer capable of either directly measuring a characteristic of the wellbore or receiving an electrical signal from a sensor, and thereafter generating an acoustic or mechanical signal. The controller can then be utilized to condition the signal to adjust or customize the signal as necessary. In some embodiments, the signal may be a digital signal or an analog signal. Thus, each EAT 910 may be utilized to propagate or emit a digital or analog frequency modulation (FM) acoustic signal or a digital or analog amplitude modulation (AM) signal.

Advantageously, the EATs are particularly useful in fiber optic sensing in which any number of downhole sensors, electronic or fiber optic based, can be utilized to make basic parameter measurements. All of the resulting information may thus be converted at the measurement location into perturbations or a strain applied to the optical fiber cable 102 that is connected to a DAS interrogator (not shown) that may be located at the surface of a downhole well. Parameters measured may include, but are not limited to, a chemical concentration, a pH, a temperature, a vibration, or a pressure. The DAS interrogator may routinely fire optical signal pulses downhole into the optical fiber cable 102. As the pulses travel down the optical fiber cable 102 back scattered light can be generated and received by the DAS interrogator. The perturbations or strains introduced to the optical fiber cable 102 at the location of the various EATs 910 can alter the back propagation of light and those effected light propagations can then provide data with respect to the signal that generated the perturbations. In some embodiments, each EAT 910 may also include one or more orientation sensors (not shown), such as accelerometers, geophones or other devices capable of detecting orientation. In such case, the signal from transducer and/or sensor can be modulated by the controller to include accelerometer data.

In some embodiments, each EAT 910 may be coupled or attached either directly or indirectly to casing 104 adjacent to the optical fiber cable 102 extending longitudinally along the casing 104. The EATs 910 may be spaced axially apart along casing 104. The EATs 910 may be embedded in the adhesive tape 106, 116, 504 at pre-determined intervals to identify the radial orientation of the casing 104 in horizontal sections. By having the EATs in very close proximity to the DAS line only a small acoustic signal may be needed. The EATs can be monitored as the casing is run-in-hole, and a profile map of the wellbore may then be created and used during perforation of the casing to avoid the optical fiber cable when firing the perforating charges.

Illustration of Subject Technology as Clauses

Various examples of aspects of the disclosure are described as numbered clauses (1, 2, 3, etc. . . . ) for convenience. These are provided as examples and do not limit the subject technology. Identification of the figures and reference numbers are provided below merely as examples for illustrative purposes, and the clauses are not limited by those identifications.

Clause 1: A method of assembling an optical fiber cable on production casing, the method comprising: positioning the optical fiber cable against a production casing at a hole of a well site; affixing the optical fiber cable against the production casing by applying an adhesive tape to the production casing to secure the optical fiber cable against the production casing; and applying pressure to the adhesive tape to adhesively bond the optical fiber cable to the production casing along a length of the production casing while the casing is being run-in-hole.

Clause 2: The method of Clause 1, wherein the adhesive comprises an adhesive tape Clause 3: The method of Clause 2, wherein the affixing comprises interposing an entirety of the optical fiber cable between the adhesive tape and the production casing.

Clause 4: The method of Clause 2, wherein the affixing comprises wrapping the adhesive tape radially over the optical fiber cable and the production casing in a series of radial bands spaced apart from each other at pre-determined intervals along the length of the production casing.

Clause 5: The method of Clause 2, wherein the affixing comprises rolling the adhesive tape linearly over the optical fiber cable and the production casing.

Clause 6: The method of Clause 2, wherein the affixing comprises rolling the adhesive tape substantially parallel relative to a longitudinal axis of the production casing.

Clause 7: The method of Clause 2, wherein the production casing is run-in-hole at a predetermined speed, and the affixing comprises rolling the adhesive tape linearly over the optical fiber cable and the production casing along the length of the casing at a speed matching the speed at which the casing is run-in-hole.

Clause 8: The method of Clause 2, wherein the production casing is run-in-hole at a predetermined speed, and the affixing comprises wrapping the adhesive tape over the optical fiber cable and the production casing in a helical configuration along the length of the production casing at a speed correlating to the speed at which the casing is run-in-hole.

Clause 9: The method of Clause 2, wherein the affixing comprises wrapping the adhesive tape over the optical fiber cable and the production casing in a helical configuration along the length of the production casing.

Clause 10: The method of Clause 9, wherein the adhesive tape is wrapped over the optical fiber cable and the production casing at a first helical pitch, the method further comprising adjusting the pitch to a second helical pitch as the casing is being run-in-hole.

Clause 11: The method of Clause 2, wherein the adhesive tape comprises (i) a flexible outer layer, and (ii) an adhesive inner layer.

Clause 12: The method of Clause 11, wherein the flexible outer layer includes a thermoset resin embedded therein, the method further comprising exposing the flexible outer layer to elevated temperatures downhole to activate and cure the thermoset resin and strengthen the adhesive bonding.

Clause 13: The method of Clause 11, wherein the adhesive inner layer comprises a pressure-sensitive material, the method further comprising exposing the adhesive inner layer to elevated pressures and temperatures downhole to cure the pressure-sensitive material into a hardened and strengthened bond with the casing.

Clause 14: The method of Clause 2, further comprising determining the speed at which the casing is being run-in-hole, and adjusting a speed at which the adhesive tape is applied over the optical fiber cable.

Clause 15: The method of Clause 2, further comprising, prior to the positioning the optical fiber cable along the length of the production casing, embedding the optical fiber cable in the adhesive tape.

Clause 16: The method of Clause 2, wherein the affixing the optical fiber cable to the production casing comprises activating a wrapping device comprising an actuator and a roller to press the adhesive tape onto the optical fiber cable about a circumference of the production casing, along the length of the production casing.

Clause 17: The method of Clause 2, wherein the affixing the optical fiber cable to the production casing comprises activating a wrapping device comprising an actuator and a roller to press the adhesive tape linearly onto the optical fiber cable along the length of the production casing.

Clause 18: The method of Clause 2, further comprising, prior to the affixing the optical fiber cable to the production casing, embedding an Electro-Acoustic Transducer (EAT) in the adhesive tape.

Clause 19: The method of Clause 18, further comprising monitoring the EAT while the casing is being run-in-hole to determine an orientation of the optical fiber cable and to avoid damaging the optical fiber cable during perforation operations.

Clause 20: A casing assembly comprising: an optical fiber cable for monitoring parameters of a wellbore in which a production casing is placed; and an adhesive applied along a length of the production casing to secure the optical fiber cable to the production casing along the length of the production casing while the production casing is being run-in-hole.

Clause 21: The casing assembly of Clause 20, wherein the adhesive comprises an adhesive tape, and the optical fiber cable is embedded in the adhesive tape.

Clause 22: The casing assembly of Clause 20, wherein the adhesive comprises an adhesive tape having (i) a flexible outer layer including a thermoset resin embedded therein, and (ii) an adhesive inner layer including a pressure-sensitive material.

Clause 23: The casing assembly of Clause 22, wherein the flexible outer layer comprises a steel material, a carbon material, a Kevlar material, or a combination thereof; and the adhesive inner layer comprises a ceramic epoxy configured to cure with elevated surrounding temperatures.

Clause 24: The casing assembly Clause 20, further comprising at least one of: a profile measuring device to measure a surface profile of the production casing and detect abnormalities in the production casing; and a velocity measuring device to align a speed at which the adhesive tape is applied over the optical fiber cable with a speed at which the casing is being run-in-hole.

Clause 25: The casing assembly of Clause 20, further comprising an Electro-Acoustic Transducer (EAT) coupled to the production casing for determining an orientation of the optical fiber cable while the production casing is being run-in-hole to avoid damaging the optical fiber cable during perforation operations, wherein the EAT is embedded in the adhesive, or attached to the casing using the adhesive.

Clause 26: The casing assembly of Clause 20, wherein the optical fiber cable is mounted in a protective flatpack, the flatpack having the adhesive disposed on an outer surface thereof to secure the optical fiber cable to the production casing along the length of the production casing.

Clause 27: The casing assembly of Clause 20, wherein an entirety of the optical fiber cable is affixed between the adhesive tape and the production casing.

Clause 28: The casing assembly of Clause 20, wherein the adhesive tape is wrapped radially over the optical fiber cable and the production casing in a series of radial bands spaced apart from each other at pre-determined intervals along the length of the production casing.

Clause 29: The casing assembly of Clause 20, wherein the adhesive tape is rolled linearly over the optical fiber cable and the production casing.

Clause 30: The casing assembly of Clause 29, wherein the affixing comprises rolling the adhesive tape substantially parallel relative to a longitudinal axis of the production casing.

Clause 31: The casing assembly of Clause 20, wherein the adhesive tape is wrapped over the optical fiber cable and the production casing in a helical configuration along the length of the production casing.

Clause 32: The casing assembly of Clause 31, wherein the adhesive tape is wrapped over the optical fiber cable and the production casing at a first helical pitch in a first section and at a second helical pitch in a second section.

Clause 33: The casing assembly of Clause 20, wherein the adhesive tape comprises (i) a flexible outer layer, and (ii) an adhesive inner layer.

Clause 34: The casing assembly of Clause 33, wherein the adhesive inner layer comprises a pressure-sensitive material configured to cure, harden, and bond to the production casing upon experiencing pressure and temperature downhole.

Clause 35: The casing assembly of Clause 20, wherein the optical fiber cable is embedded in the adhesive tape.

Clause 36: A wrapping device for securing an optical fiber cable to a production casing, the device comprising: at least one actuator and roller to press the adhesive tape onto the optical fiber cable along the length of the production casing.

Clause 37: The wrapping device of Clause 36, further comprising at least one of: a profile measuring device to measure a surface profile of the production casing and detect abnormalities in the production casing; or a velocity measuring device to align a speed at which the adhesive tape is applied over the optical fiber cable with a speed at which the casing is being lowered into the hole.

Clause 38: The wrapping device of Clause 36, wherein the wrapping device comprises at least one of: a linear wrapping device configured to affix the adhesive tape linearly over the optical fiber cable and the production casing; or a rotating wrapping device configured to wrap the adhesive tape over the casing in at least one of a spiral configuration, a configuration of a series of radial bands spaced apart from each other, or a combination of thereof.

Further Considerations

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the disclosure. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

One or more illustrative aspects incorporating the features of the present disclosure are presented herein. Not all features of a physical implementation are necessarily described or shown in this application for the sake of clarity. It is to be understood that in the development of a physical implementation incorporating the aspects of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

In the description herein, directional terms such as "above", "below", "upper", "lower", and the like, are used for convenience in referring to the accompanying drawings. In general, "above", "upper", "upward" and similar terms refer to a direction toward the exit of a wellbore, often toward the earth's surface, and "below", "lower", "downward" and similar terms refer to a direction away from the exit of a wellbore, often away from the earth's surface.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the aspects of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular aspects disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount.

Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method of assembling an optical fiber cable on a production casing, the method comprising:
   positioning the optical fiber cable against the production casing at a hole of a well site, wherein positioning the optical fiber cable includes rolling the cable onto an outer surface of the production casing using at least one roller and pressing the optical fiber cable against the outer surface of the production casing using at least one set of actuators engaging with a set of press-rollers;
   measuring a surface profile of the production casing to detect any abnormalities in the surface profile;
   affixing the optical fiber cable against the production casing by applying an adhesive to the production casing to secure the optical fiber cable against the production casing; and
   applying pressure to the adhesive to adhesively bond the optical fiber cable to the production casing along a length of the production casing while the casing is being run-in-hole;
   wherein the applying pressure to the adhesive comprises adjusting an amount of pressure applied to adjust for any abnormalities detected in the surface profile of the production casing.

2. The method of claim 1, wherein the adhesive comprises an adhesive tape.

3. The method of claim 2, wherein the affixing comprises wrapping the adhesive tape radially over the optical fiber cable and the production casing in a series of radial bands spaced apart from each other at pre-determined intervals along the length of the production casing.

4. The method of claim 2, wherein the affixing comprises rolling the adhesive tape linearly over the optical fiber cable and the production casing.

5. The method of claim 2, wherein the production casing is run-in-hole at a predetermined speed, and the affixing comprises rolling the adhesive tape linearly over the optical fiber cable and the production casing along the length of the casing at a speed matching the speed at which the casing is run-in-hole.

6. The method of claim 2, wherein the affixing comprises wrapping the adhesive tape over the optical fiber cable and the production casing in a helical configuration along the length of the production casing.

7. The method of claim 2,
wherein the production casing is run-in-hole at a predetermined speed, and the affixing comprises wrapping the adhesive tape over the optical fiber cable and the production casing in a helical configuration along the length of the production casing at a speed correlating to the speed at which the casing is run-in-hole; and
wherein the adhesive tape is wrapped over the optical fiber cable and the production casing at a first helical pitch, the method further comprising adjusting the first helical pitch to a second helical pitch as the casing is being run-in-hole.

8. The method of claim 2, wherein the adhesive tape comprises (i) a flexible outer layer, and (ii) an adhesive inner layer.

9. The method of claim 8, wherein the flexible outer layer includes a thermoset resin embedded therein, the method further comprising exposing the flexible outer layer to elevated temperatures downhole to activate and cure the thermoset resin and strengthen the adhesive bonding.

10. The method of claim 8, wherein the adhesive inner layer comprises a pressure-sensitive material, the method further comprising exposing the adhesive inner layer to elevated pressures and temperatures downhole to cure the pressure-sensitive material into a hardened and strengthened bond with the casing.

11. The method of claim 2, further comprising, prior to the positioning the optical fiber cable along the length of the production casing, embedding the optical fiber cable in the adhesive tape.

12. The method of claim 2, wherein the affixing the optical fiber cable to the production casing comprises activating a wrapping device comprising an actuator and a roller to press the adhesive tape onto the optical fiber cable about a circumference of the production casing, along the length of the production casing.

13. The method of claim 2, wherein the affixing the optical fiber cable to the production casing comprises activating a wrapping device comprising an actuator and a roller to press the adhesive tape linearly onto the optical fiber cable along the length of the production casing.

14. The method of claim 2, further comprising,
prior to the affixing the optical fiber cable to the production casing, embedding an Electro-Acoustic Transducer (EAT) in the adhesive tape; and
monitoring the EAT while the casing is being run-in-hole to determine an orientation of the optical fiber cable and to avoid damaging the optical fiber cable during perforation operations.

15. An apparatus comprising:
an optical fiber cable for monitoring parameters of a wellbore in which a production casing is placed;
one or more rollers for rolling the optical fiber cable onto an outer surface of the production casing;
at least one set of actuators that engage with a set of press-rollers for pressing the optical fiber cable against the outer surface of the production casing;
a profile measuring device for detecting abnormalities in the surface profile of the production casing; and
an adhesive applied along a length of the production casing to secure the optical fiber cable to the production casing along the length of the production casing while the production casing is being run-in-hole;
wherein as the adhesive is applied along the length of the production casing, pressure applied to the adhesive is varied to adjust for abnormalities detected in the surface profile of the production casing.

16. The apparatus of claim 15, wherein the adhesive comprises an adhesive tape, and the optical fiber cable is embedded in the adhesive tape.

17. The apparatus of claim 15, wherein the adhesive comprises an adhesive tape having (i) a flexible outer layer including a thermoset resin embedded therein, and (ii) an adhesive inner layer including a pressure-sensitive material.

18. The apparatus of claim 17, wherein:
the flexible outer layer comprises a steel material, a carbon material, a Kevlar material, or a combination thereof; and
the adhesive inner layer comprises a ceramic epoxy configured to cure with elevated surrounding temperatures.

19. The apparatus of claim 15, further comprising an Electro-Acoustic Transducer (EAT) coupled to the production casing for determining an orientation of the optical fiber cable while the production casing is being run-in-hole to avoid damaging the optical fiber cable during perforation operations, wherein the EAT is embedded in the adhesive, or attached to the casing using the adhesive.

20. The apparatus of claim 15, wherein the optical fiber cable is mounted in a protective flatpack, the protective flatpack having the adhesive disposed on an outer surface thereof to secure the optical fiber cable to the production casing along the length of the production casing.

* * * * *